Patented Feb. 17, 1942

2,273,031

UNITED STATES PATENT OFFICE 2,273,031

PHYSIOLOGICALLY ACTIVE ALKALOID FROM SPECIES OF ERYTHRINA AND PROCESSES FOR ITS PRODUCTION

Karl Folkers, Plainfield, and Frank Koniuszy, Rahway, N. J., assignors to Merck & Co., Inc., Rahway, N. J., a corporation of New Jersey No Drawing. Application February 1, 1940, Serial No. 316,718

7 Claims. (Cl. 260—236)

This application is a continuation-in-part of our application Serial No. 273,366, filed May 12, 1939.

This invention relates to substances having a physiological action similar to that of the drug, curare, and to processes for their production from species of the genus Erythrina.

Plants of the species of the genus, Erythrina (fam. Leguminosae sup. fam. Papilionaceae) are distributed throughout the world, but are found in greatest profusion in the tropical and subtropical regions. It has been known that some species of Erythrina contain alkaloids, but the only such alkaloid which has even been isolated in pure form, and chemically identified, is the alkaloid "Hypaphorine." However, this alkaloid is relatively inactive physiologically, a property common to several alkaloid betaines. Other than this, it has only been known that alkaloids were present in a few Erythrina species, and this was known generally because of the toxic effect exhibited by the species. Nothing has been known regarding the nature of the alkaloids.

There is a definite need in medicine for drugs which may be used for certain neuro-muscular diseases. The drug "curare," the arrow poison, is a crude, complex mixture obtained from many plants (species of Strychnos, Menispermaceous plants, etc.). Curare is difficult to obtain, is expensive, and its action, potency and toxicity, vary according to the plants used as a source, their geographical origin, processes and care used in their preparation, etc. For these reasons, it is not well suited for use in medicine.

In co-pending applications, Serial Nos. 180,143 and 221,596, filed by one of us, it is disclosed that species of Erythrina contain an alkaloidal free fraction which acts to paralyze selectively the motor nerve ending of striated muscle, or exhibit a typical curare-like action. These new substances may be substituted for curare.

The physiologically active alkaloidal free fraction is found in various parts of plants of the species of Erythrina, such as the bark of stems or roots, seeds, flowers, etc. The alkaloidal fraction obtained from all of the species exhibits similar physiological action.

In the co-pending applications, there are disclosed processes for the production of the active alkaloidal free fraction from various species of the genus Erythrina, which shows a typical curare-like action—that of selectively paralyzing the motor nerve endings of striated muscle. It is further disclosed that the active free fraction from a particular species may contain a number of individual alkaloids which exhibit similar pharmacological properties, but which exhibit different physical and chemical properties, and that for this reason it was necessary to develop special methods of isolation and purification for each individual alkaloid.

The present application is a continuation-in-part of the above mentioned co-pending applications, and is directed to special processes for the preparation of the three alkaloids, erythramine, erythraline and erythratine, from the total alkaloidal free fraction obtained from a certain group of species of the genus Erythrina.

According to the co-pending applications several methods may be employed for obtaining the active fraction. In many cases, the inert alkaloid hypaphorine occurs with the new physiologically active alkaloidal free fraction and, if present, may be separated from the crude extract before the latter is treated for the production of the active substances. This may be accomplished by acidulating the aqueous extract containing the alkaloids and other extractives, extracting out any fatty material and crystallizing out the corresponding hypaphorine salt by concentration. The solution remaining after the hypaphorine separation may then be slightly alkalinized and further processed for the production of the physiologically active alkaloidal free fraction.

According to the preferred method, however, the selected starting material (that is seeds, flowers, etc.) may be freed from fats inherent therein, the alkaloids extracted with an agent such as methyl alcohol, and the alcoholic extract evaporated. The alkaloidal fraction thus obtained is dissolved in water, the aqueous solution acidified, and any residual fats extracted. The aqueous mixture is then made slightly alkaline and extracted with an immiscible solvent for the direct production of the physiologically active alkaloidal free fraction.

The solvents to be employed for removing the fatty substances will depend upon the selected starting material. For example, when seeds are used, the fatty substances inherent therein may be removed by extraction with petroleum ether. Any traces of the active alkaloidal free fraction removed with the fatty substances may be recovered by extraction of the solvents with dilute aqueous acids.

For extraction of the physiologically active alkaloidal free fraction from the alkaline solution, a water immiscible organic solvent such as chloroform is preferred.

Also, in treating the seeds, it has been found that the alkaloidal free fraction may be obtained by treating the ground seeds, or defatted ground seeds, with water. The aqueous solution is freed of fatty material and concentrated to crystallize hypaphorine and the residue is then worked up for the production of the active principles.

In treating the bark of roots, stems, or flowers, the resinous substances are separated out together with the active alkaloidal free fraction by extracting with an alcohol such as methyl or ethyl alcohol and the resinous substances precipitated by treatment with water. The water used at this point may be acidulated water. Following their precipitation, the resinous materials may be removed by filtration, and the filtrate further processed for producing the active alkaloid.

The total alkaloidal free fraction thus obtained may then be treated for the production of individual alkaloids therefrom.

For the production of the three specific alkaloids, erythramine, erythraline and erythratine, the total alkaloidal free fraction is first converted to a mixture of hydriodides, which are fractionally crystallized from ethyl alcohol. In this manner, there is first obtained a mixture of erythramine and erythraline hydriodides, which may be separated by fractional crystallization from water. The erythraline salt being least soluble is obtained first; from it the crystalline base is obtained and recrystallized from alcohol. The pure crystalline erythraline has a melting point of about 105–107°, and rotation $[\alpha]^{27}_D = +211.8°$. Pure crystalline erythramine has a melting point of about 103–104° C.; $[\alpha]^{29}_D = +227.6°$.

From the salt mixture remaining in the alcoholic mother liquors after crystallization of the erythramine-erythraline hydriodide mixture, another individual alkaloid, erythratine, may be crystallized in the form of its hydriodide, from which the free base may be obtained and recrystallized from diethyl ether. Pure crystalline erythratine has a melting point of about 170–170.5°, and rotation $[\alpha]^{25}_D = +145.5$ (absolute alcohol).

All of these new alkaloids exhibit a strong paralyzing effect on the motor nerve endings.

The genus Erythrina may be divided into several sections or groups, each of which comprises several species which bear a certain botanical relationship to each other and which contain essentially the same alkaloids.

The species mentioned herein is an example of species which contain quantities of the alkaloids, erythramine, erythraline and erythratine. It is to be understood that other species which bear certain botanical relationships to the species illustrated in the following examples may be utilized also for the extraction of erythramine, erythraline and erythratine by the methods herein shown.

However, in some instances, where one or the other individual alkaloid may be present in preponderantly large quantity, it may be advisable to apply the process to the production of such alkaloid.

The procedures exemplified may be appropriately modified and adapted to the individual species being treated, as may be deemed desirable, in view of the teachings herein, without departing from the spirit and scope of the invention.

*Example I*

The crude active alkaloidal free fraction obtained from seeds of Erythrina glauca Willd. according to the methods referred to above, is dissolved in about three parts of absolute alcohol and treated with the calculated quantity of sodium iodide and glacial acetic acid. The amount and degree of dryness of the alcohol is adjusted so that the sodium acetate remains dissolved. After standing at 10° C., the solution is filtered to obtain the mixed hydriodides. Such a salt mixture generally melts at about 242–244° C. with decomposition and shows $[\alpha]^{27.5°}_D = +196.4°$ (approximately). A second crop of salts obtained from the mother liquor by concentrating to approximately half volume, melts at 241–243° C. with decomposition and shows $[\alpha]^{27°}_D = +200.8°$. A third crop of hydriodide obtained from the mother liquor by concentrating again to half volume, melts at 242° C. with decomposition and shows $$[\alpha]^{26°}_D = +119.0°$$

The first two crops of salts are mixtures of erythraline hydriodide and erythramine hydriodide and are separated by recrystallizing from water. The erythraline hydriodide separates first and gives a melting point of 249° C. with decomposition and $[\alpha]^{27°}_D = +176.9°$. The erythramine hydriodide separates from the mother liquor after concentration and standing and gives a melting point of 248–249° C. with decomposition and $[\alpha]^{27°}_D = +220.6°$.

The third crop of hydriodide crystals showing $[\alpha]^{26°}_D = +119°$ is practically pure erythratine hydriodide which is recrystallized from absolute alcohol to give a salt having a melting point of about 242° C. and $[\alpha]^{25°}_D = +110.2°$ (water). The yield was 0.007%.

*Example II*

Erythratine base is obtained by dissolving the hydriodide in water, adding sodium bicarbonate until the solution is alkaline and extracting with chloroform. The solvent is distilled off in vacuo, whereupon the erythratine is obtained as a viscous gum which is recrystallized from a mixture of anhydrous ethyl ether and petroleum ether. It has a melting point of about 170–170.5° C., $[\alpha]^{25°}_D = +145.5°$ (absolute alcohol). It is a hemi-hydrate.

Erythratine hydrobromide is obtained by dissolving the erythratine base in absolute ethanol, adding the calculated quantity of 40% aqueous hydrobromic acid and adding anhydrous ethyl ether to the point of turbidity. The erythratine hydrobromide melts at about 241° C. with decomposition; $[\alpha]_D +158.7$ (water).

The pure erythratine base may also be obtained directly from the total alkaloidal free fraction obtained from certain species of Erythrina by crystallization of such fraction from ethanol. The yield of erythratine thus obtained is about twice as much as the yield obtained through fractional crystallization of the hydriodides. The direct crystallization process is illustrated in the following example.

*Example III*

The crude total alkaloidal free fraction (23.7 g.) obtained from about 12 kgs. of seeds of Erythrina glauca (Wortley 9242) is dissolved in about 72 ml. of 95% ethanol. On standing, crystals of erythratine hemihydrate are formed which melt at about 167.5–168° C. and $[\alpha]_D +138.6$, absolute ethanol. It is recrystallized twice by dissolving in about 20 ml. of absolute ethanol, distilling to 8 ml., and adding petroleum ether to incipient crystallization. The final yield of pure erythratine hemihydrate base (2.16 g. or 0.018%) has a melting point of about 170° C.; $[\alpha]^{28}_D + 145.5°$ C.=0.371, absolute ethanol.

The yield of erythratine hemihydrate obtained may be increased by chilling the ethanol solution of the crude alkaloidal fraction.

We claim:

1. A substance selected from the group consisting of the alkaloid erythratine, obtainable from certain botanically related species of Erythrina, the hemihydrate of said alkaloid having a melting point of about 170–170.5° C., and $[\alpha]^{25}_D = +145.5°$ (absolute alcohol), and hydrohalides of said alkaloid.

2. The alkaloid erythratine, obtainable from certain botanically reated species of Erythrina, which in its hemihydrate form has a melting point of about 170–170.5° C., and $[\alpha]^{25}_D = +145.5°$ (absolute alcohol).

3. Hydrohalides of the alkaloid erythratine, obtainable from certain botanically related species of Erythrina, and the hemihydrate of which has a melting point of about 170–170.5° C., and $[\alpha]^{25}_D = +145.5°$ (absolute alcohol).

4. The hydrobromide of the alkaloid erythratine, obtainable from certain botanically related species of Erythrina, the hemihydrate of said alkaloid having a melting point of about 170–170.5° C., and $[\alpha]^{25}_D = +145.5°$ (absolute alcohol), and said hydrobromide having a melting point of about 241° C., and $[\alpha]_D = +158.7°$ (water).

5. The hydriodide of the alkaloid erythratine, obtainable from certain botanically related species of Erythrina, the hemihydrate of said alkaloid having a melting point of about 170–170.5° C., and $[\alpha]^{25}_D = +145.5°$ (absolute alcohol), and said hydriodide having a melting point of about 242° C., and $[\alpha]^{25}_D = +110.2°$ (water).

6. A process for the production of the alkaloid erythratine, which in its hemihydrate form has a melting point of about 170–170.5° C., and $[\alpha]^{25}_D = +145.5°$ (absolute alcohol), from parts of botanically related species of Erythrina containing preponderant quantities of said alkaloid, comprising dissolving the physiologically active "free" fraction from said species in ethanol and permitting the solution to stand until erythratine only is selectively crystallized out.

7. A process for the production of the alkaloid erythratine, which in its hemihydrate form has a melting point of about 170–170.5° C., and $[\alpha]^{25}_D = +145.5°$ (absolute alcohol), from parts of botanically related species of Erythrina containing preponderant quantities of said alkaloid, comprising dissolving the physiologically active "free" fraction from *Erythrina glauca* Willd. in ethanol and permitting the solution to stand until erythratine only is selectively crystallized out.

KARL FOLKERS.
FRANK KONIUSZY.